US012670723B2

(12) United States Patent
Kim et al.

(10) Patent No.: US 12,670,723 B2
(45) Date of Patent: Jun. 30, 2026

(54) APPARATUS AND METHOD FOR RECOGNIZING AN OBJECT

(71) Applicants: HYUNDAI MOTOR COMPANY, Seoul (KR); KIA CORPORATION, Seoul (KR)

(72) Inventors: Jun Hyung Kim, Seoul (KR); Hee Chul Choi, Seoul (KR); Jong Hyuk Lim, Seoul (KR); Tae Koan Yoo, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 429 days.

(21) Appl. No.: 18/131,239

(22) Filed: Apr. 5, 2023

(65) Prior Publication Data

US 2024/0104935 A1 Mar. 28, 2024

(30) Foreign Application Priority Data

Sep. 26, 2022 (KR) ........................ 10-2022-0121885

(51) Int. Cl.
*G06V 20/58* (2022.01)
*G06V 10/77* (2022.01)
*G06V 10/82* (2022.01)

(52) U.S. Cl.
CPC .......... *G06V 20/58* (2022.01); *G06V 10/7715* (2022.01); *G06V 10/82* (2022.01)

(58) Field of Classification Search
CPC .... G06V 20/58; G06V 10/7715; G06V 10/82; G06V 10/806; G06V 20/647; G06V 20/56; G06V 10/14; G06V 10/40; G06V 2201/12; G06N 3/08; G06N 3/0464; G01S 17/89; G06T 3/06; G06T 5/00; G06T 2207/20081; G06T 2207/20084
USPC ........................................................ 382/103
See application file for complete search history.

(56) References Cited

U.S. PATENT DOCUMENTS

| | | | |
|---|---|---|---|
| 10,670,725 B2 | 6/2020 | Tisdale et al. | |
| 11,004,233 B1* | 5/2021 | Wang | G06V 20/588 |
| 11,346,951 B2 | 5/2022 | Lu et al. | |
| 2019/0033459 A1 | 1/2019 | Tisdale et al. | |
| 2020/0249359 A1 | 8/2020 | Tisdale et al. | |
| 2021/0104056 A1 | 4/2021 | Lee et al. | |

(Continued)

FOREIGN PATENT DOCUMENTS

| | | | |
|---|---|---|---|
| CN | 110945379 A | 3/2020 | |
| CN | 113343746 A * | 9/2021 | G06F 18/24 |

(Continued)

*Primary Examiner* — Amandeep Saini
(74) *Attorney, Agent, or Firm* — Lempia Summerfield Katz LLC

(57) ABSTRACT

An apparatus for recognizing an object includes a camera that obtains a 2D image, a lidar that obtains a 3D image, and a processor. The processor generates a bird's-eye view (BEV) feature map by extracting features from a two-dimensional plane BEV generated based on 3D information. The processor also generates an image feature map by extracting features of a multi-channel 2D image in which the 3D information is added to the 2D image. The processor also generates a complex feature map by mixing the image feature map and the BEV feature map. The processor also recognizes the object by artificial intelligence learning the complex feature map.

14 Claims, 17 Drawing Sheets

(56)　　　　　　References Cited

U.S. PATENT DOCUMENTS

| 2024/0062520 A1* | 2/2024 | Park | B60R 1/28 |
| 2024/0208547 A1* | 6/2024 | Yang | G01S 17/89 |

FOREIGN PATENT DOCUMENTS

| KR | 101899549 B1 | | 9/2018 |
| KR | 20210026412 A | * | 8/2019 |
| KR | 102108953 B1 | | 5/2020 |
| KR | 102226372 B1 | | 3/2021 |
| KR | 102269750 B1 | | 6/2021 |
| KR | 20220099679 A | | 7/2022 |

* cited by examiner

101 → H x W x 32
102 → H x W x 64
103 → H/2 x W/2 x 128
104 → H/4 x W/4 x 128
105 → H/8 x W/8 x 256
106 → H/16 x W/16 x 256
107 → H/8 x W/8 x 128
108 → H/4 x W/4 x 128
109 → H/2 x W/2 x 64
110 → H x W x 64
111 → H x W x 32

World
Coordinates

Camera
Coordinates

Image
Coordinates

GROUND TRUTH

YOLO OUTPUT
ACCORDING TO EMBODIMENT

GENERAL YOLO OUTPUT

YOLO OUTPUT ACCORDING TO EMBODIMENT

GENERAL YOLO OUTPUT

GROUND TRUTH

YOLO OUTPUT
ACCORDING TO EMBODIMENT

GENERAL YOLO OUTPUT

YOLO OUTPUT ACCORDING TO EMBODIMENT

GENERAL YOLO OUTPUT

GROUND TRUTH

YOLO OUTPUT
ACCORDING TO EMBODIMENT

GENERAL YOLO OUTPUT

YOLO OUTPUT ACCORDING TO EMBODIMENT

GENERAL YOLO OUTPUT

APPARATUS AND METHOD FOR RECOGNIZING AN OBJECT

CROSS-REFERENCE TO RELATED APPLICATION

This application claims the benefit of priority to Korean Patent Application No. 10-2022-0121885, filed in the Korean Intellectual Property Office on Sep. 26, 2022, the entire contents of which are incorporated herein by reference.

TECHNICAL FIELD

The present disclosure relates to an apparatus and a method for recognizing an object, and more particularly, to a technology capable of more accurately determining and recognizing an object.

BACKGROUND

A vehicle may be classified into an internal combustion engine vehicle, an external combustion engine vehicle, a gas turbine vehicle, an electric vehicle, and the like, depending on the type of motive power used.

An autonomous vehicle refers to a vehicle that can operate by itself without the manipulation of a driver or a passenger. An automated vehicle and highway system refers to a system that monitors and controls such an autonomous vehicle to operate by itself.

In addition to the autonomous vehicle, technologies for monitoring the outside of a vehicle for driving assistance of a driver and operating various driving assistance units based on the monitored external environment of the vehicle have been proposed.

Therefore, in order to more precisely control the operation of a driving assistance unit, there is a need to more quickly and accurately monitor the external environment of a vehicle.

SUMMARY

The present disclosure has been made to solve the above-mentioned problems occurring in the prior art while advantages achieved by the prior art are maintained intact.

An aspect of the present disclosure provides an apparatus and a method for recognizing an object capable of more quickly and accurately monitoring an external environment of a vehicle.

Another aspect of the present disclosure provides an apparatus and a method for recognizing an object capable of more accurately classifying an object that is difficult to classify only by size.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for recognizing an object includes a camera that obtains a 2D image, a lidar that obtains a 3D image, and a processor. The processor generates a bird's-eye view (BEV) feature map by extracting features from a two-dimensional plane BEV generated based on 3D information. The processor also generates an image feature map by extracting features of a multi-channel 2D image in which the 3D information is added to the 2D image. The processor also generates a complex feature map by mixing the image feature map and the BEV feature map. The processor also recognizes the object by artificial intelligence learning the complex feature map.

According to an embodiment, the processor may obtain a BEV image based on intensity information, density information, and height information from the lidar and may generate the BEV feature map by learning the BEV image using a convolutional neural network.

According to an embodiment, the processor may generate the multi-channel 2D image by mapping the 3D information to the 2D image and may generate the image feature map by learning the multi-channel 2D image.

According to an embodiment, the processor may generate the multi-channel 2D image in which a number of channels is expanded by mapping the intensity information, the density information, and three-dimensional coordinate information obtained through the lidar to the 2D image.

According to an embodiment, the processor may normalize a Z value of the intensity information, the density information, and three-dimensional coordinate information to a magnitude of 0 to 1.

According to an embodiment, the processor may learn the multi-channel 2D image by using a dilated convolution neural network.

According to an embodiment, the processor may generate the complex feature map by extending a number of channels of the image feature map and the BEV feature map.

According to an embodiment, the processor may generate a corrected image feature map equal to a resolution of the BEV feature map by correct a resolution of the image feature map. The processor may also generate the complex feature map by mixing components of coordinates corresponding to each other in the corrected image feature map and the BEV feature map.

According to an embodiment, the processor may mix feature values of the coordinates corresponding to each other in the corrected image feature map and the BEV feature map by using at least one of an addition scheme, a combination scheme, an average, or a combination thereof.

According to an embodiment, the processor may learn the complex feature map by using a you-only-look once (YOLO) model.

According to an aspect of the present disclosure, a method of recognizing an object includes generating, by a processor, a bird's-eye view (BEV) feature map by extracting features from a two-dimensional plane BEV generated based on 3D information. The method also includes generating, by the processor, an image feature map by extracting features of a multi-channel 2D image in which the 3D information is added to a 2D image. The method also includes generating, by the processor, a complex feature map by mixing the image feature map and the BEV feature map and recognizing the object by learning the complex feature map.

According to an embodiment, the generating of the BEV feature map may include obtaining, by a lidar, the 3D information including intensity information, density information, and three-dimensional coordinate information. The generating of the BEV feature map may also include obtaining, by the processor, a BEV image including height information among the intensity information, the density information, and the three-dimensional coordinate information. The generating of the BEV feature map may also include learning, by the processor, the BEV image by using a convolutional neural network.

According to an embodiment, the generating of the image feature map may include: obtaining, by a camera, a red-green-blue (RGB) image; generating, by the processor, a multi-channel 2D image by mapping the 3D information to the RGB image; and learning, by the processor, the multi-channel 2D image.

According to an embodiment, the learning of the multi-channel 2D image may include generating the multi-channel 2D image having 8 channels by mapping the intensity information, the density information, and the 3D coordinate information obtained through the lidar to the RGB image.

According to an embodiment, the learning of the multi-channel 2D image may include normalizing a Z value of the intensity information, the density information, and the three-dimensional coordinate information to a magnitude of 0 to 1.

According to an embodiment, the learning of the multi-channel 2D image may include using a dilated convolution neural network.

According to an embodiment, the generating of the complex feature map may include extending a number of channels of the image feature map and the BEV feature map.

According to an embodiment, the generating of the complex feature map may include matching a resolution of the image feature map with a resolution of the BEV feature map and mixing components of coordinates corresponding to each other in the image feature map and the BEV feature map.

According to an embodiment, the mixing of the components of the coordinates may include using at least one of an addition scheme, a combination scheme, an average, or a combination thereof.

According to an embodiment, the recognizing of the object may include using a you-only-look once (YOLO) model.

BRIEF DESCRIPTION OF THE DRAWINGS

The above and other objects, features, and advantages of the present disclosure should be more apparent from the following detailed description taken in conjunction with the accompanying drawings.

4

Figure 13:
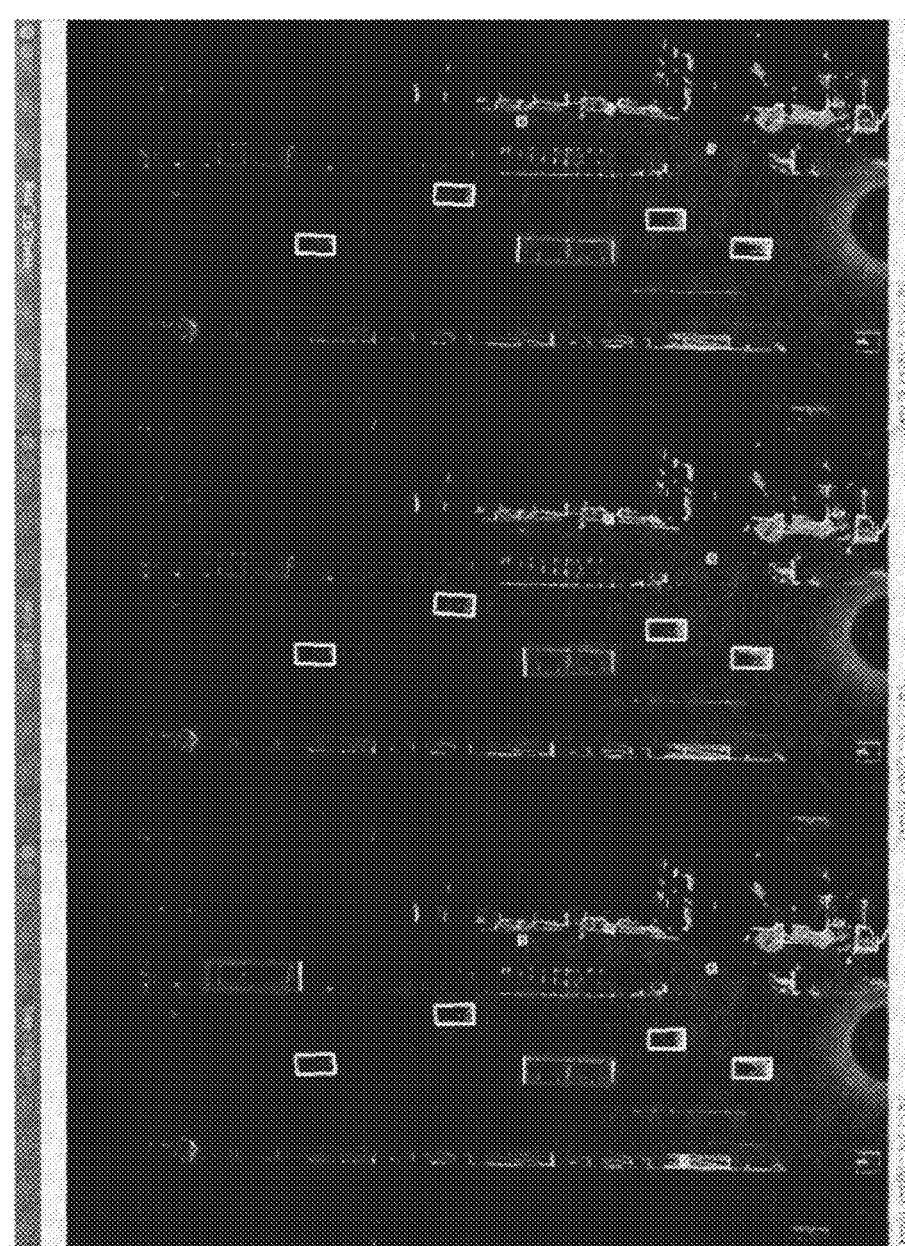
Figure 14:
Figure 14:
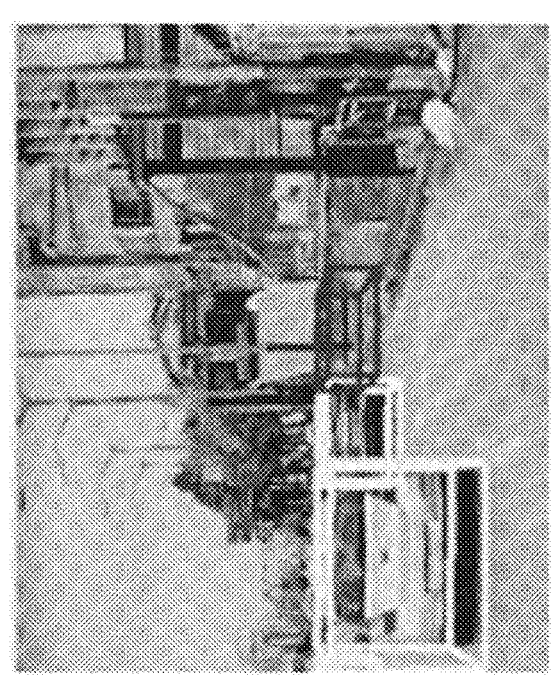
Figure 14:
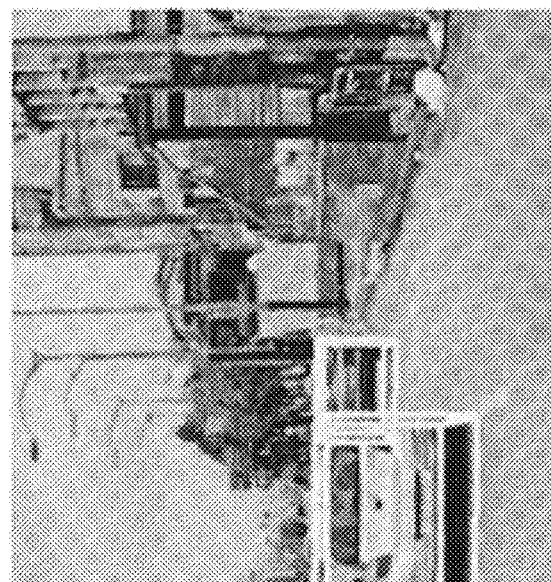
Figure 15:
Figure 15:
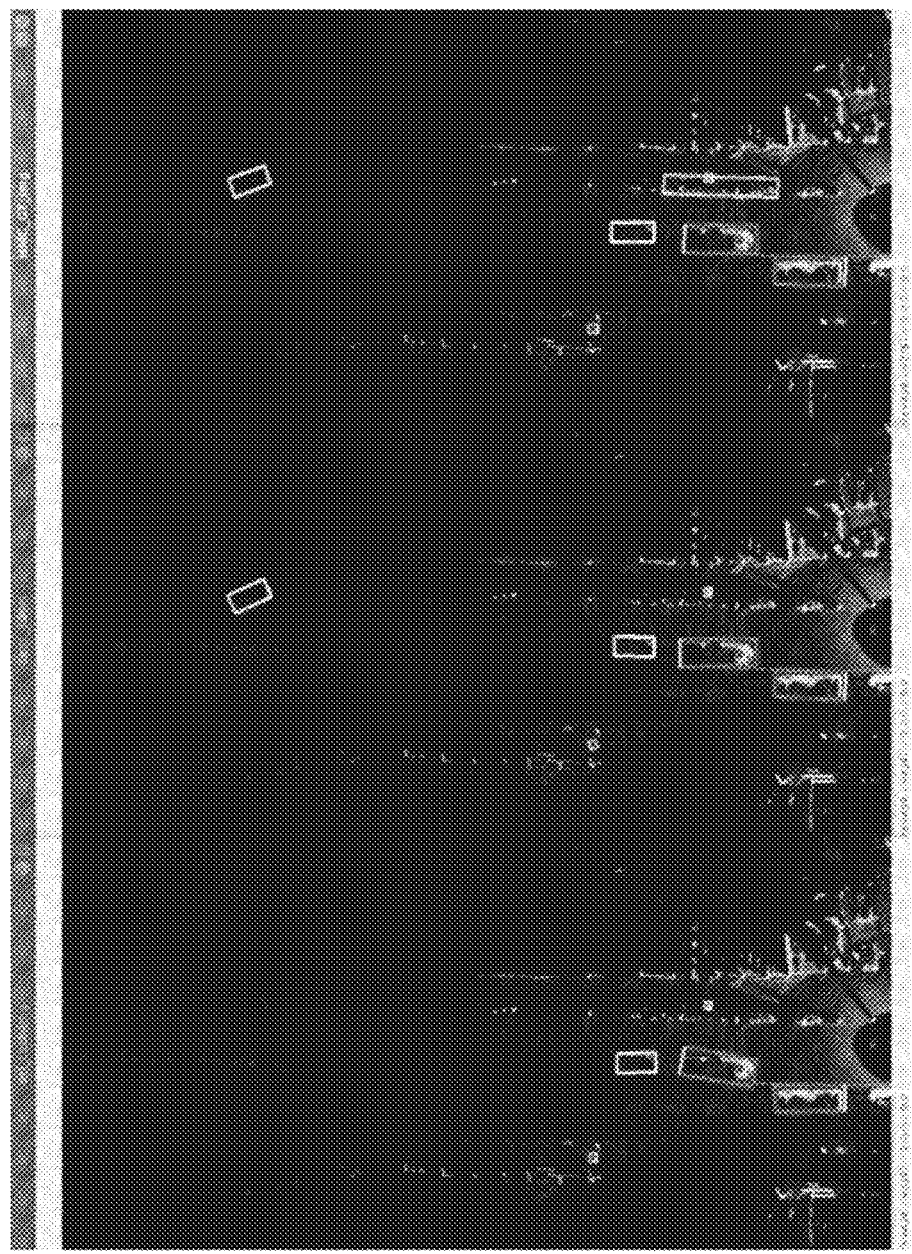
Figure 16:
Figure 16:
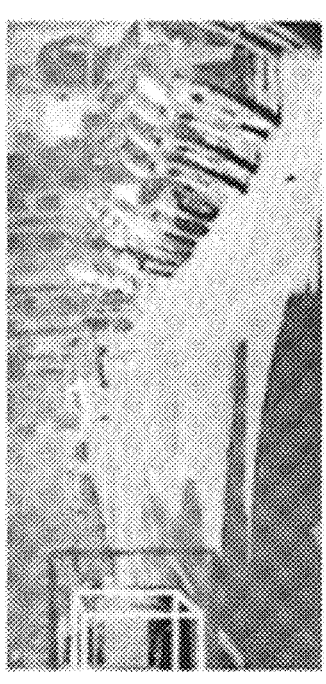
Figure 16:
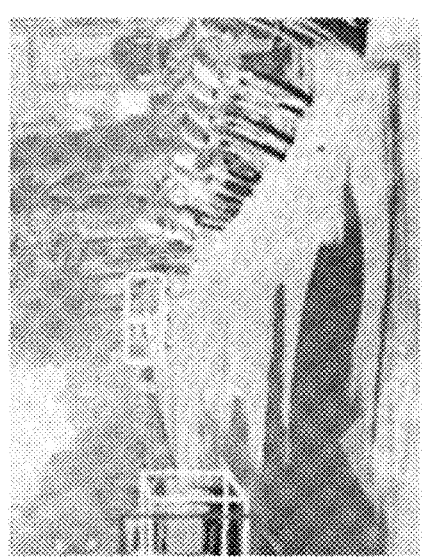
Figure 17:
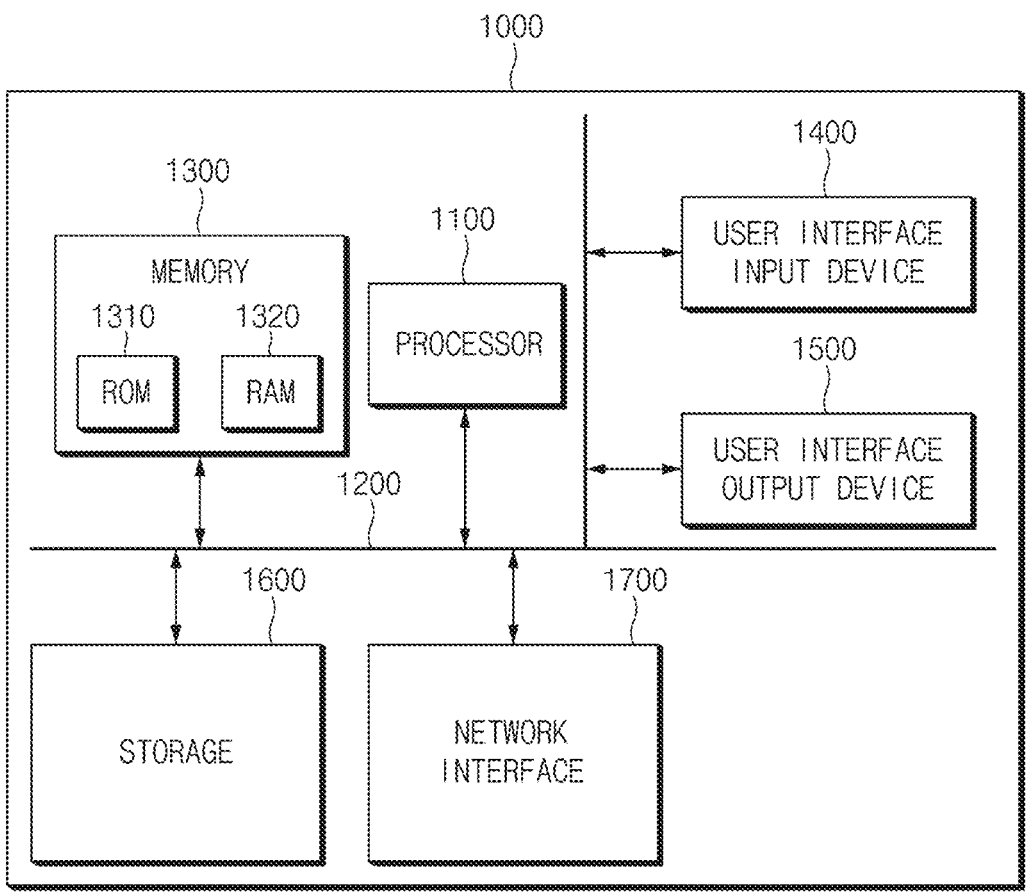

FIGS. 13 and 14 are diagrams illustrating an improvement result of a determination error of a distant object;

FIGS. 15 and 16 are diagrams illustrating an improvement result of omission of detection of a distant object; and FIG. 17 is a block diagram illustrating a computing system according to an embodiment of the present disclosure.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-17.

Figure 1:
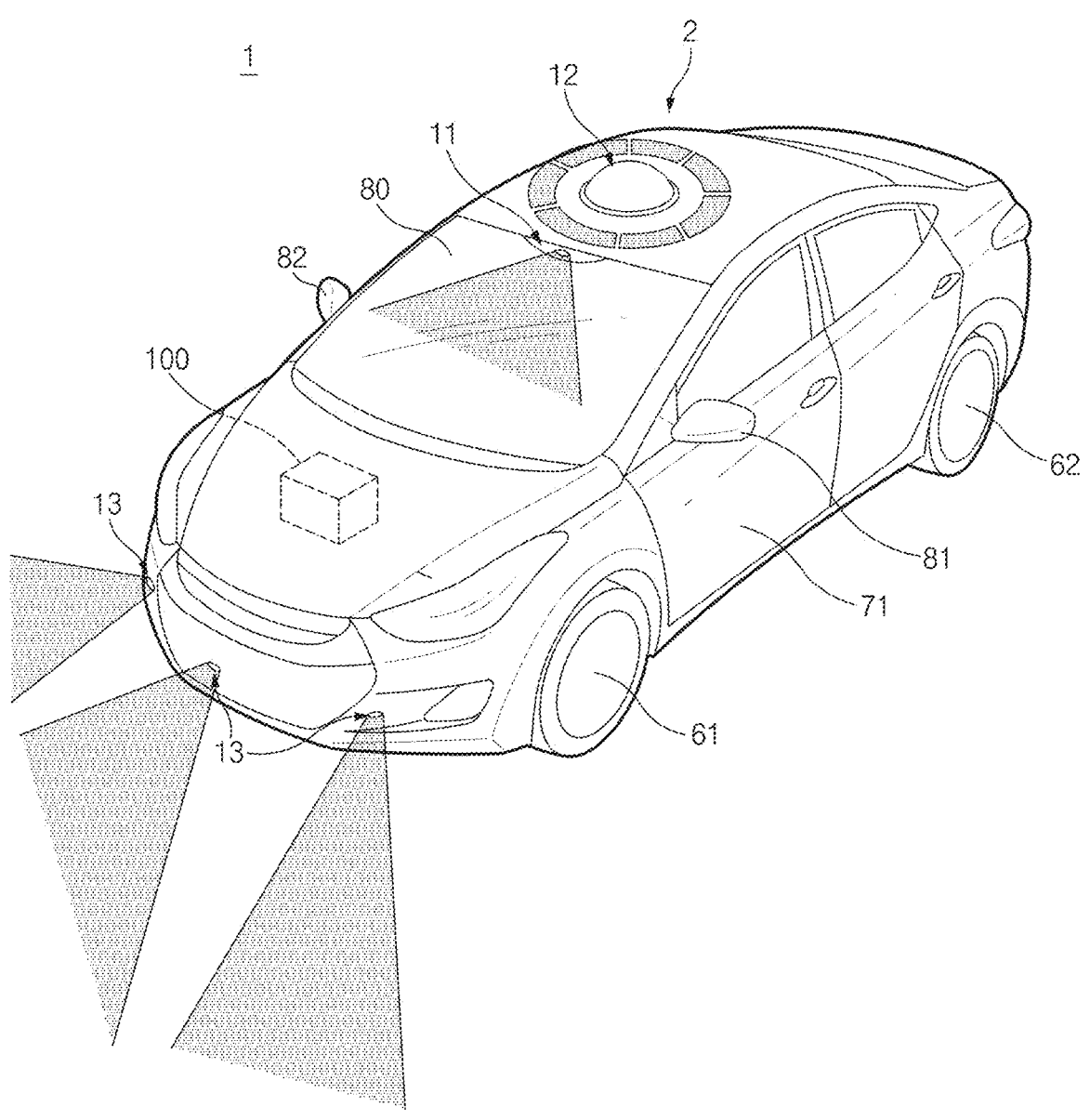
FIG. 1 is a diagram illustrating a vehicle including an object tracking device according to an embodiment of the present disclosure.
Figure 2:
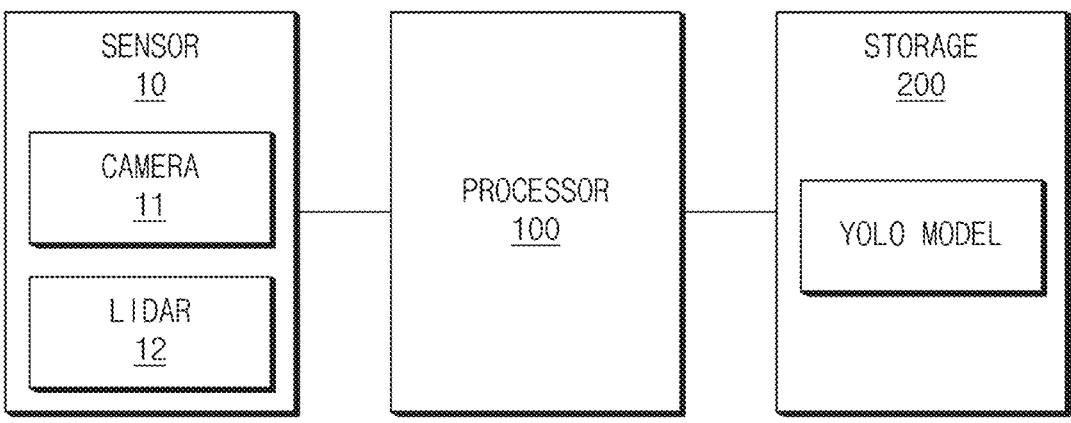
FIG. 2 is a block diagram illustrating the configuration of an object tracking device.

FIG. 1 is a diagram illustrating a vehicle including an object tracking device according to an embodiment of the present disclosure. FIG. 2 is a block diagram illustrating the configuration of an object tracking device.

Referring to FIG. 1, according to an embodiment of the present disclosure, a vehicle 1 may include a main body 2 defining an external appearance, wheels 61 and 62 for moving the vehicle 1, a door 71 for shielding the inside of the vehicle 1 from the outside, a windshield 80 for providing a front field of view of the vehicle 1 to a user inside the vehicle 1, and side mirrors 81 and 82 for providing side and rear fields of view of the vehicle 1 to the user.

The wheels 61 and 62 may include the front wheel 61 provided at the front of the vehicle and the rear wheel 62 provided at the rear of the vehicle. The front wheel 61 and the rear wheel 62 may be rotated by a driving device to move the vehicle 1.

The door 71 is rotatably provided on the left and right sides of the main body 2 such that an occupant can board the inside of the vehicle 1 when the door 71 is opened. The inside of the vehicle 1 can be shielded from the outside when the door 71 is closed.

The windshield 80, which is a type of windscreen, may be provided on the front upper side of the main body 2 to provide front view information of the vehicle 1 to a driver or user inside the vehicle 1.

The side mirrors 81 and 82 may include the left side mirror 81 provided on the left side of the main body 2 and the right side mirror 82 provided on the right side of the main body. The side mirrors 81 and 82 may provide side and rear view information to a driver inside the vehicle 1.

The vehicle 1 may be an electrification-based vehicle such as an electric vehicle (EV), a hybrid electric vehicle (HEV), a plug-in hybrid vehicle (PHEV), or a fuel cell electric vehicle (FCEV), or the like. In the case of an electrification-based vehicle, a driving device 60 may be a driving motor.

FIG. 2 is a block diagram illustrating an apparatus for recognizing an object according to an embodiment of the present disclosure.

Referring to FIG. 2, an apparatus for recognizing an object according to an embodiment of the present disclosure may include a sensor 10 and a processor 100.

The sensor 10, which is to obtain sensing data for extracting an object around a vehicle, may include a camera 11, a lidar 12, and/or the like. Locations at which the camera 11 and the lidar 12 are installed may not be limited to FIG. 1.

The camera 11 may obtain image data based on detecting light in the visible ray region in the front of the vehicle.

The lidar 12 may determine an object by transmitting a laser pulse and measuring the time until the transmitted laser pulse is reflected and returned. The lidar 12 may provide three-dimensional information.

In addition, the sensor 10 may further include a radar 13 that transmits an electromagnetic wave and analyzes an object by analyzing the returned electromagnetic wave, as shown in FIG. 1. The radar 13 may provide two-dimensional information and may quickly provide information about an object.

The processor 100 may extract an object based on the information obtained by the camera 11 and the lidar 12 and classify the object.

The processor 100 may extract features for a two-dimensional plan bird's-eye view (BEV) based on 3D information to generate a BEV feature map. In addition, the processor 100 may obtain a multi-channel 2D image in which 3D information is added to the 2D image. In addition, the processor 100 may extract features of the multi-channel 2D image to generate an image feature map. In addition, the processor 100 may generate a complex feature map by mixing the image feature map and the BEV feature map and may recognize an object by artificial intelligence learning the complex feature map.

Storage 200 may store an algorithm for recognizing an object.

The algorithm for recognizing an object may be performed based on artificial intelligence. To this end, the processor 100 may include an artificial intelligence (AI) processor. The AI processor may learn a neural network by using a pre-stored program. The neural network may be designed to simulate a human brain structure on a computer and may include a plurality of network nodes having weights that simulate neurons of the human neural network. In a plurality of network modes, a neuron that transmits and receives a signal through a synapse may transmit and receive data according to a connection relationship to simulate the synaptic activity of a neuron. The neural network may include a deep learning model developed from a neural network model. In a deep learning model, a plurality of network nodes may exchange data according to a convolutional connection relationship while being located in different layers. For example, a neural network model may include various deep learning schemes such as a deep neural network (DNN), a convolutional deep neural network (CNN), a recurrent Boltzmann machine (RNN), a restricted Boltzmann machine (RBM), a deep belief network (DBN), a deep Q-network, and the like.

In addition, the storage 200 may include a You-Only-Look-Once (YOLO) model.

The storage 200 may be provided in the processor 100 and may be a separate memory. Accordingly, the storage 200 may include a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

Figure 3:
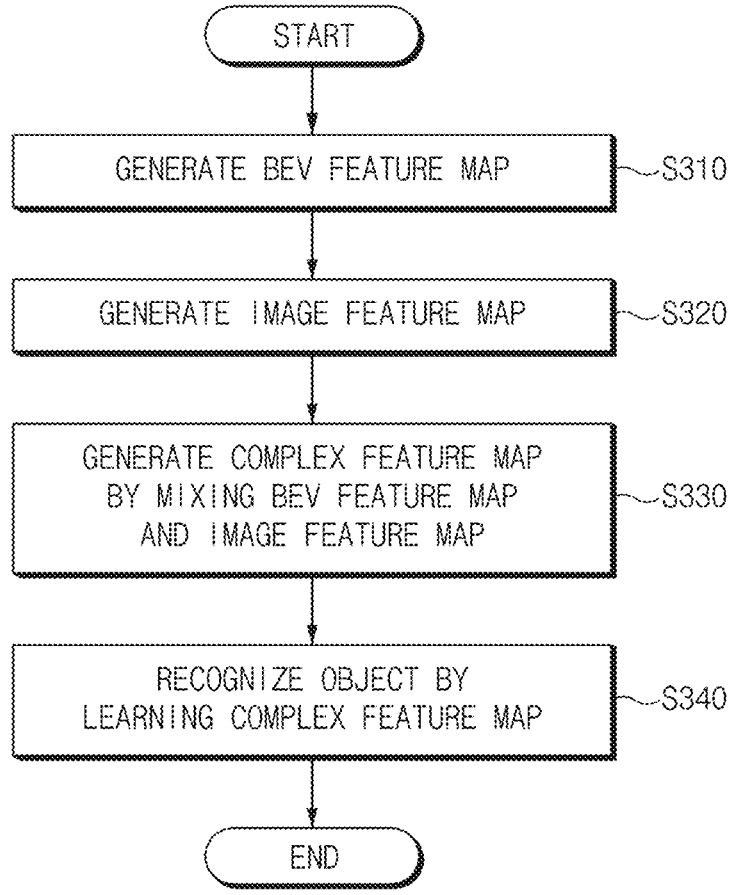
FIG. 3 is a flowchart illustrating a method of recognizing an object according to an embodiment of the present disclosure.
Figure 4:
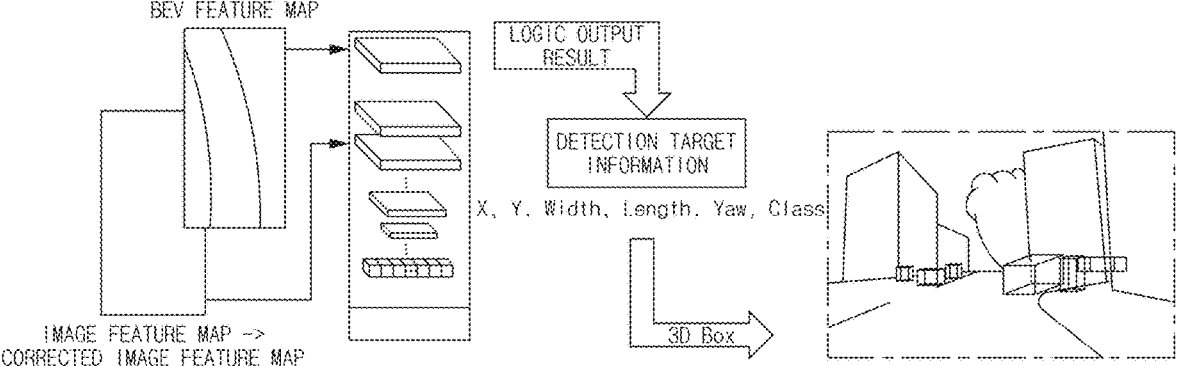
FIG. 4 is a schematic diagram illustrating a method of recognizing an object according to an embodiment of the present disclosure.

FIG. 3 is a flowchart illustrating a method of recognizing an object according to an embodiment of the present disclosure. FIG. 4 is a schematic diagram illustrating a method of recognizing an object according to an embodiment of the present disclosure.

FIG. 3 illustrates a procedure performed by the apparatus for recognizing an object illustrated in FIGS. 1 and 2.

Hereinafter, a method of recognizing an object according to an embodiment of the present disclosure is described with reference to FIGS. 3 and 4.

In S310, the processor 100 may generate a BEV feature map by extracting a feature value (feature) from the BEV image.

To this end, the processor 100 may receive a BEV image from the lidar 12 or may generate a BEV image based on 3D information provided from the lidar 12.

In addition, the processor 100 may generate a BEV feature map from the BEV image based on a convolutional neural network (CNN).

In S320, the processor 100 may generate an image feature map from a 2D image.

The 2D image may be a color image obtained through the camera 11.

The processor 100 may generate an image feature map by extracting feature values from the 2D image. To this end, the processor 100 may artificial intelligence learn the 2D image.

In S330, the processor 100 may generate a complex feature map by mixing the BEV feature map and the image feature map.

In order to generate the complex feature map, the processor 100 may match the resolutions of the BEV feature map and the image feature map. According to an embodiment, the processor 100 may generate a corrected image feature map by correcting the resolution of the image feature map to correspond to the resolution of the BEV feature map.

In S340, the processor 100 may recognize an object by artificial intelligence learning the complex feature map.

The processor 100 may output 3D coordinates of the object as a result of recognizing the object.

In addition, the processor 100 may output the width, length, and yaw information of the object.

In addition, the processor 100 may classify a class of the object and may express the classified objects as a labeling box.

According to an embodiment, the processor 100 may learn the complex feature map by using a YOLO model.

Because the processor 100 according to an embodiment of the present disclosure recognizes an object based on the complex feature map, it is possible to determine the object by using both 2D image information and 3D lidar information. Accordingly, according to an embodiment of the present disclosure, by more accurately discriminating an object, it is possible to more accurately classify an object and to improve object detection.

Hereinafter, each procedure according to an embodiment of the present disclosure is described in more detail as follows.

Figure 5:
FIG. 5 is a diagram illustrating an example of a bird's-eye view (BEV) image.

FIG. 5 is a diagram illustrating an example of a BEV image.

Referring to FIG. 5, the procedure of S310 described above is described in more detail as follows.

In order to generate a BEV image, the processor 100 may receive 3D information from the lidar 12.

The 3D information may be obtained based on raw data output from the lidar 12. The 3D information may include information on coordinate values (X, Y, Z) indicating a three-dimensional position of an object, an intensity I, and a density D.

The processor 100 may obtain a BEV image as in FIG. 5 based on 3D information. The BEV image may be a bird's eye view (BEV) of 3D lidar information projected onto a 2D plane. The two-dimensional plane may correspond to the ground surface.

In addition, the BEV image according to the embodiment may include height information among intensity information, density information, and 3D coordinate information. Accordingly, the BEV image may include three channels. For example, the size of the BEV image may be 448×896×3.

The processor 100 may generate a BEV feature map from a BEV image based on a convolutional neural network (CNN). The processor 100 may generate a BEV feature map of which the channel is expanded to 448×896×32 based on the convolutional neural network.

Figure 6:
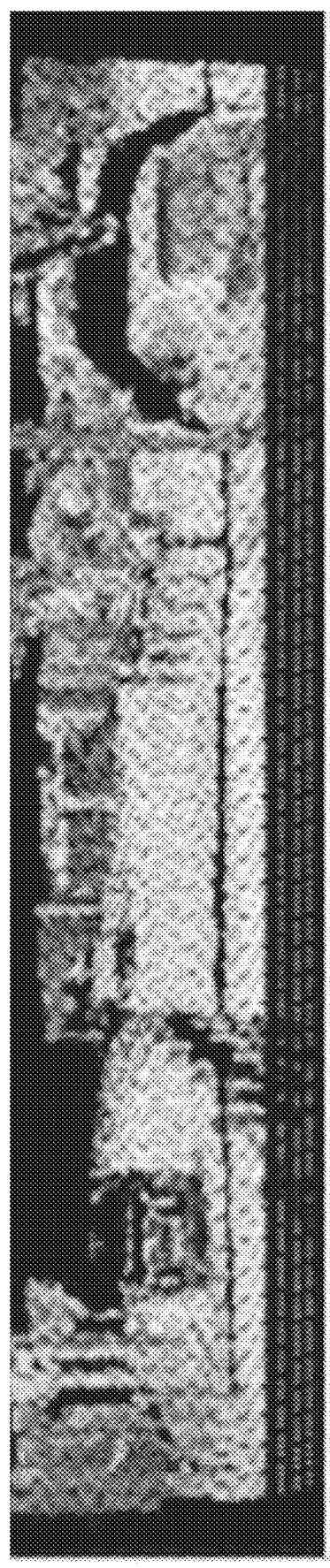
FIG. 6 is a diagram illustrating an example of a multi-channel 2D image.
Figure 7:
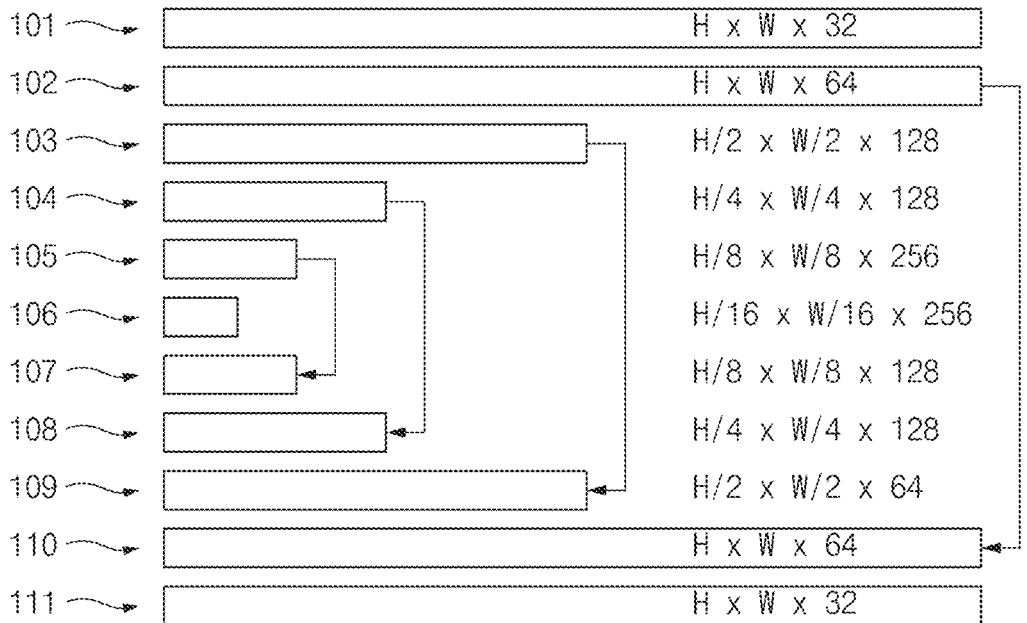
FIG. 7 is a schematic diagram illustrating a model for generating an image feature map.
Figure 8:
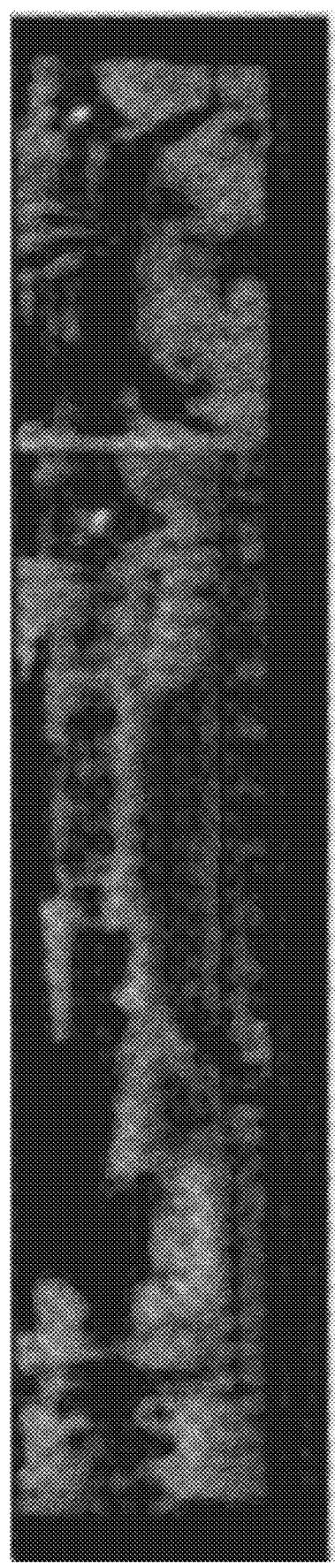
FIG. 8 is a diagram illustrating an example of an image feature map.

FIG. 6 is a diagram illustrating an example of a multi-channel 2D image. FIG. 7 is a schematic diagram illustrating a model for generating an image feature map. FIG. 8 is a diagram illustrating an example of an image feature map.

Hereinafter, the above-described procedure of S320 is described in more detail with reference to FIGS. 6, 7, and 8.

The processor 100 may receive a 2D image from the camera 11. The 2D image may be a color image including red-green-blue (RGB) components and thus may include an R channel, a G channel, and a B channel. The resolution of the 2D image according to an embodiment may be 384×80, and the number of channels may be three including R, G and B channels. In other words, the size of the 2D image may be 384×80×3.

The processor 100 may add 3D information to the 2D image. The 3D information may be obtained based on raw data output from the lidar 12. The 3D information may include information on coordinate values (X, Y, Z) indicating a three-dimensional position of an object, the intensity I, and the density D.

The processor 100 may generate a multi-channel 2D image of which the channel is extended by adding 3D information to the 2D image.

According to an embodiment, the processor 100 may generate a multi-channel 2D image having 8 channels by adding 5 channels of 3D information to 3 channels of the 2D image.

The 3D information added to generate a multi-channel 2D image may include the coordinate values (X, Y, Z), the intensity I, and the density D.

The height information Z may be normalized by being adjusted to a range of 0 to 1.

The intensity I may be normalized by being adjusted to the range of 0 to 1.

The density D may be normalized by being adjusted to the range of 0 to 1.

The size of the multi-channel 2D image may be obtained based on the following Equation 1 and Equation 2.

$$x_{img} = \frac{h_{max} - h_{min}}{h_{res}} \qquad y_{img} = \frac{v_{max} - v_{min}}{v_{res}} \qquad \text{[Equation 1]}$$

$$x_{img} = -\frac{\arctan\left(\frac{y_{3d}}{x_{3d}}\right)}{h_{res} \times \frac{\pi}{180}} - \frac{h_{min}}{h_{res}} \qquad \text{[Equation 2]}$$

$$y_{img} = -\frac{\arctan\left(\frac{z_{3d}}{\sqrt{x_{3d}^2 + y_{3d}^2}}\right)}{v_{res} \times \frac{\pi}{180}} + \frac{v_{max}}{v_{res}}$$

In Equations 1 and 2, $x_{img}$ represents the X-axis size of the multi-channel 2D image and $y_{img}$ represents the Y-axis size of the multi-channel 2D image. Also, h_max represents the maximum horizontal angle of view of the multi-channel 2D image and h_min represents the minimum horizontal angle of view of the multi-channel 2D image. Further, v_max represents the vertical maximum angle of view of the multi-channel 2D image and v_min represents the vertical minimum angle of view of the multi-channel 2D image. Also, h_res and v_res represent coefficients that determine horizontal and vertical pixel sizes of the multi-channel 2D image.

Accordingly, (h_max−h_min) may be a horizontal angle of view seen in the multi-channel 2D image.

In addition, when the horizontal angle of view is divided by h_res, a value indicating how many pixels will be expressed in the horizontal direction in the multi-channel 2D image may be obtained.

For example, when h_max=50 degrees, h_min=−50 degrees, and h_rev=1, it may be calculated as (h_max−h_min)/h_rev=100. In other words, in this case, the horizontal size of the multi-channel 2D image may be determined as 100 pixels.

In addition, when v_max=15 degrees, v_min=−15 degrees, and v_rev=0.6, it may be calculated as (v_max−v_min)/v_rev=50. In other words, in this case, the vertical size of the multi-channel 2D image may be determined as 50 pixels.

In this manner, the processor 100 may obtain the multi-channel 2D image in which 3D information is added to the 2D image.

The processor 100 may generate an image feature map based on a multi-channel 2D image as in FIG. 6. To this end, the processor 100 may generate the image feature map by using dilated convolution. The processor 100 may forcibly increase the receptive field by adding zero padding to the inside of the filter based on the dilated convolution. The processor 100 may increase the size of the receptive field without performing pooling based on the dilated convolution and may increase the arithmetic efficiency.

Referring to FIG. 7, a dilated convolution model may include first to eleventh modules 101 to 111.

The first module 101 may generate a feature map having an output channel of 32 while maintaining resolution by using a 3×3 filter for a 2D image.

The second module 102 may generate a feature map having an output channel of 64 while maintaining a resolution with respect to the feature map output from the first module 101.

The third module 103 may generate a feature map having an output channel of 128 while reducing the resolution to ¼ with respect to the feature map output from the second module 102.

The fourth module 104 may generate a feature map having an output channel of 128 while reducing the resolution to ¼ with respect to the feature map output from the third module 103.

The fifth module 105 may generate a feature map having an output channel of 256 while reducing the resolution to ¼ with respect to the feature map output from the fourth module 104.

The sixth module 106 may generate a feature map having an output channel of 256 while reducing the resolution to ¼ with respect to the feature map output from the fifth module 105.

The seventh module 107 may generate a feature map having an output channel of 128 while reducing the resolution by 4 times with respect to the feature map output from the sixth module 106.

The eighth module 108 may generate a feature map having an output channel of 128 while reducing the resolution by 4 times with respect to the feature map output from the seventh module 107.

The ninth module 109 may generate a feature map having an output channel of 64 while reducing the resolution by 4 times with respect to the feature map output from the eighth module 108.

The tenth module 110 may generate a feature map having an output channel of 64 while reducing the resolution by 4 times with respect to the feature map output from the ninth module 109.

The eleventh module 111 may generate a feature map having an output channel of 32 while maintaining the resolution with respect to the feature map output from the tenth module 110.

The processor 100 may generate an image feature map of H×W×32 size in which the number of channels is expanded based on the multi-channel 2D image of the H×W×8 size as described above.

In procedure S330, the processor 100 may match the resolution of the image feature map and the resolution of the BEV feature map to generate the complex feature map.

To this end, the processor 100 may use a preset coordinate transformation map.

The coordinate transformation map may include mapping information between a 2D image and a BEV image.

The processor 100 may convert the resolution of the 2D image to the resolution of the BEV image based on the coordinate transformation map.

The coordinate transformation map may be obtained by using the calibration of the camera 11 for obtaining a 2D image and the lidar 12 for obtaining 3D information.

Figure 9:
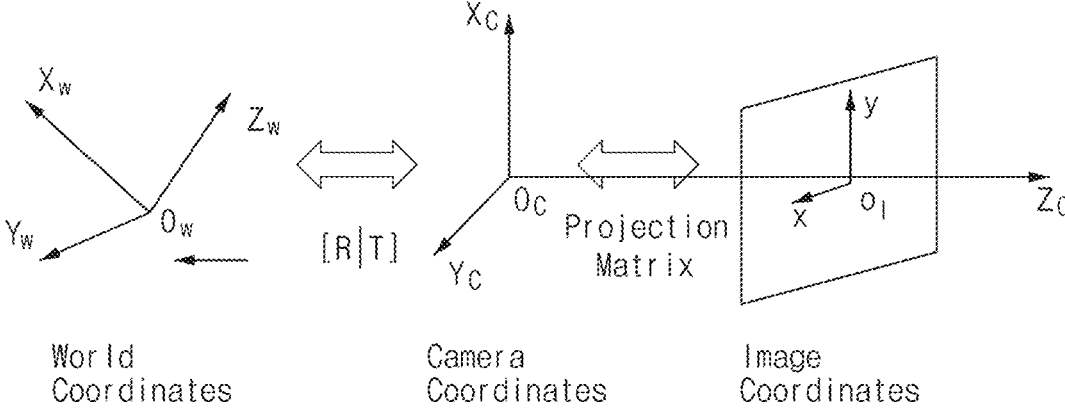
FIG. 9 is a schematic diagram illustrating calibration.

FIG. 9 is a schematic diagram illustrating calibration. In FIG. 9, world coordinates may be coordinates representing the position of 3D information obtained through the lidar. Camera coordinates may be coordinates representing positions of lenses and image sensors of a camera obtained by the camera. The image coordinates may be coordinates representing positions of pixels in a 2D image obtained by a camera.

Referring to FIG. 9, calibration may be for obtaining parameters for geometric factors that occur due to an internal or external environment of the camera 11 when points in a three-dimensional space are projected on a two-dimensional image plane. The parameter may include an extrinsic parameter indicating the relative position of the camera compared to the real three-dimensional coordinate system. The parameter may also include intrinsic parameters including internal factors or elements defining internal characteristics of the camera.

The coordinate transformation map may be preset based on calibration information including parameters and stored in the storage 200.

Figure 10:
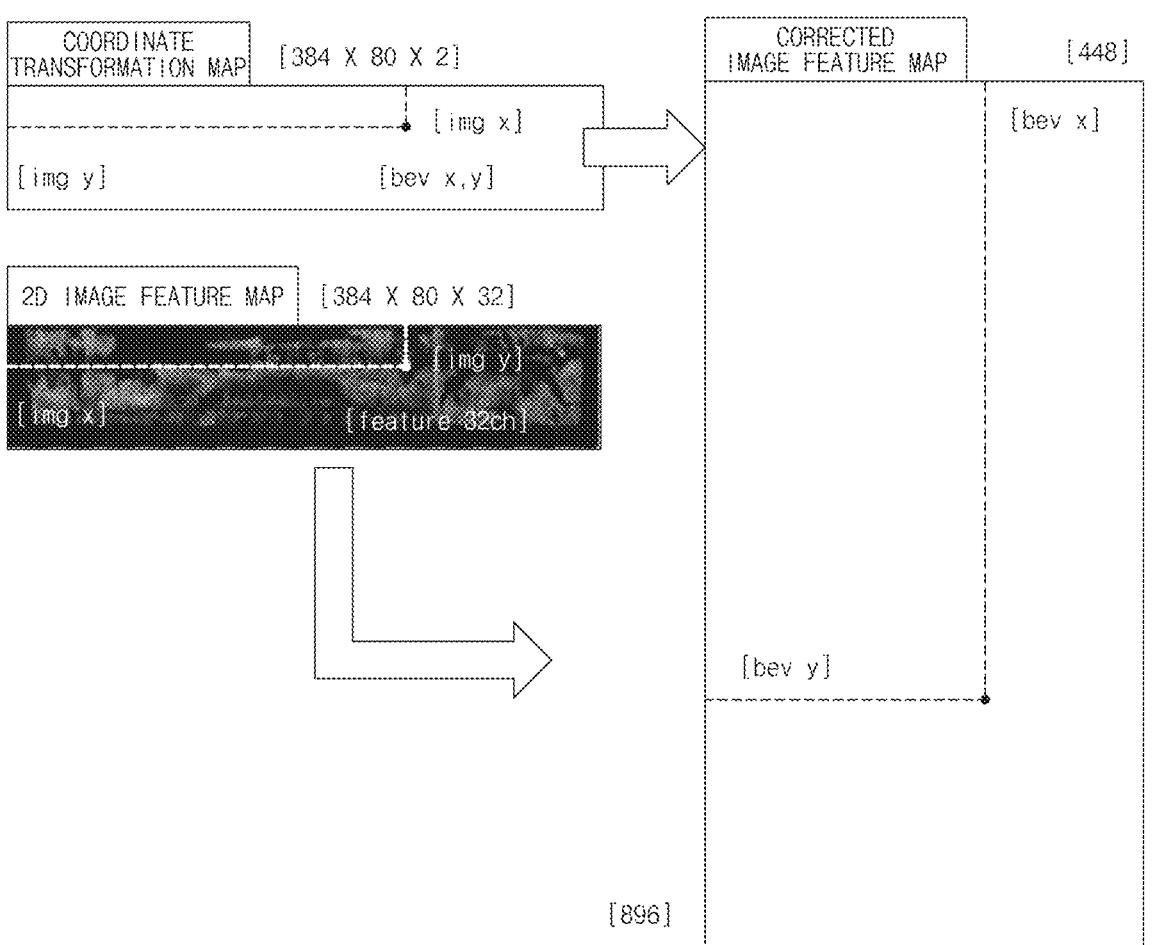
FIG. 10 is a schematic diagram illustrating a procedure for generating a corrected image feature map.

FIG. 10 is a schematic diagram illustrating a procedure for generating a corrected image feature map.

Referring to FIG. 10, the processor 100 may generate a corrected image feature map in which the resolution of the image feature map is corrected by using the coordinate transformation map.

For example, the processor 100 may convert the x coordinate of the image feature map into the bev x coordinate to correspond to the resolution of the BEV feature map by using the coordinate transformation map. Likewise, the processor 100 may convert the y coordinate of the image feature map into the bev y coordinate to correspond to the resolution of the BEV feature map by using the coordinate transformation map. In other words, the processor 100 may generate the corrected image feature map having the coordinates of (bev x, bev y) based on the (x,y) coordinates of the image feature map.

The corrected image feature map may have a size of 448×896 having the same resolution as the BEV feature map.

Because the coordinates of the image feature map and the corrected image feature map do not match one-to-one, the coordinates of the corrected image feature map may use information interpolated based on the coordinates of the image feature map.

The processor 100 may use various schemes for a procedure of generating a complex feature map by mixing feature values of coordinates corresponding to each other in the corrected image feature map and the BEV feature map.

According to an embodiment, the processor 100 may generate a complex feature map by using an addition scheme.

According to an embodiment, the processor 100 may generate a complex feature map by using a concatenation scheme.

According to an embodiment, the processor 100 may generate a complex feature map by averaging the feature values.

The processor 100 may use a YOLO model to recognize an object based on a complex feature map.

The YOLO model, which is a single-step object recognition algorithm, may be a model capable of predicting an object existing in an image and a position of the object by viewing the object only once. The YOLO model may determine the attributes of the bounding box and the object at the same time and display the result value based on the determination result.

FIGS. 11-16 are diagrams illustrating an object recognition simulation result according to an embodiment of the present disclosure. In FIGS. 11-16, the general YOLO output is a diagram illustrating the result of using only the BEV feature map as an input of the YOLO model, and the YOLO output according to an embodiment is a diagram illustrating the result of driving the YOLO model using a complex feature map in which an image feature map and a BEV feature map are mixed. In addition, the ground truth is a diagram illustrating correct answer data.

Figure 11:
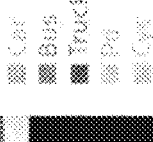
FIGS. 11 and 12 are diagrams illustrating the improvement of the accuracy of class classification.
Figure 11:
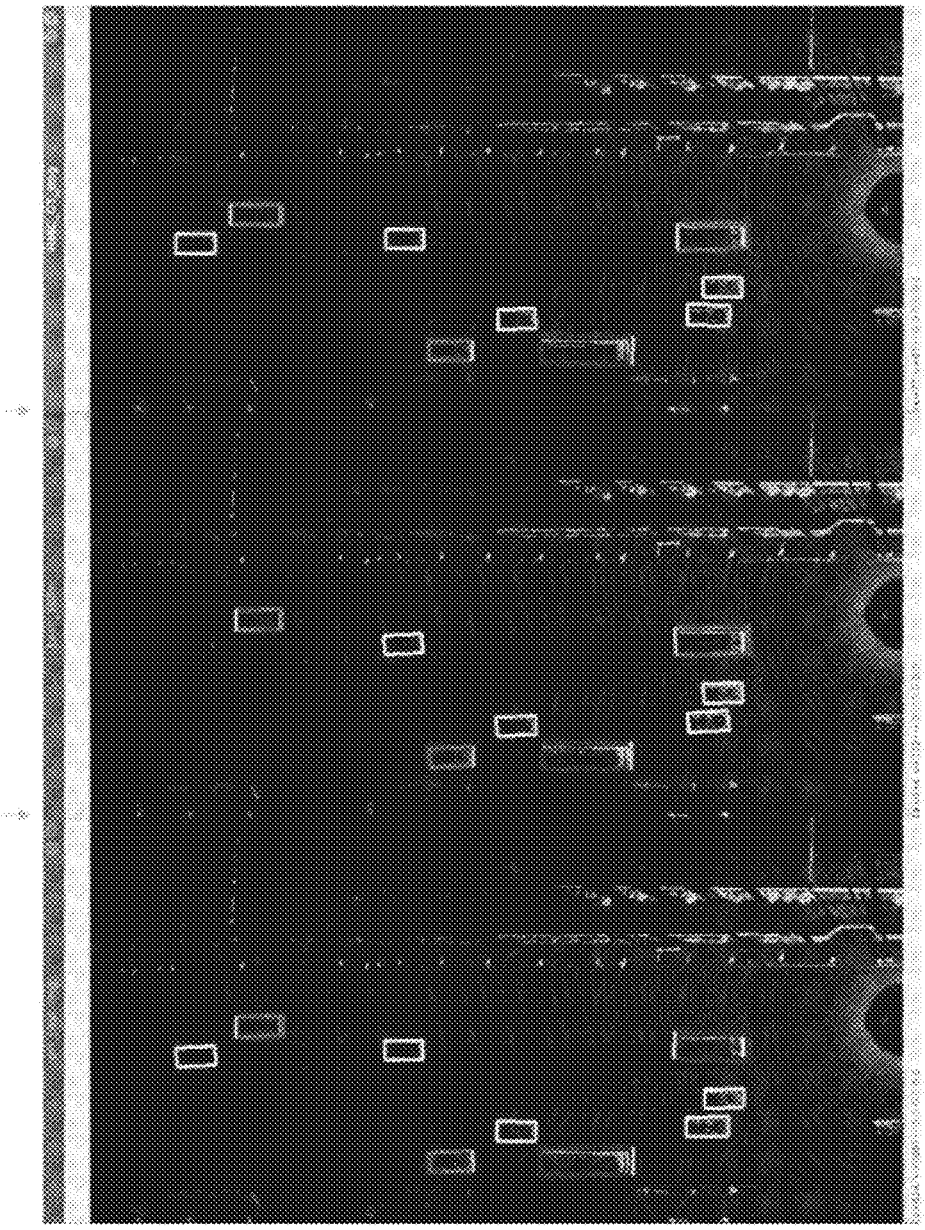
Figure 12:
Figure 12:
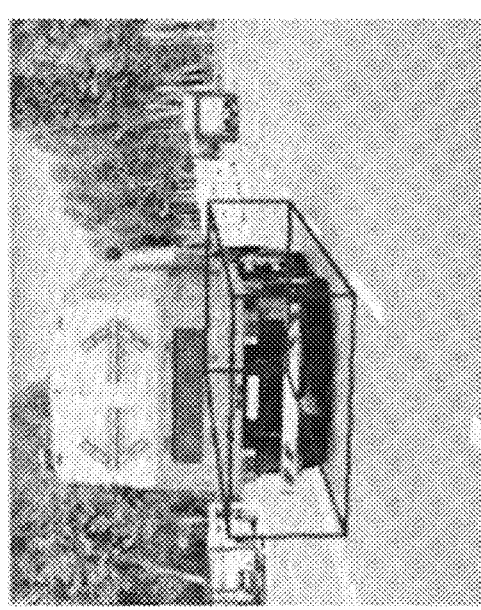
Figure 12:
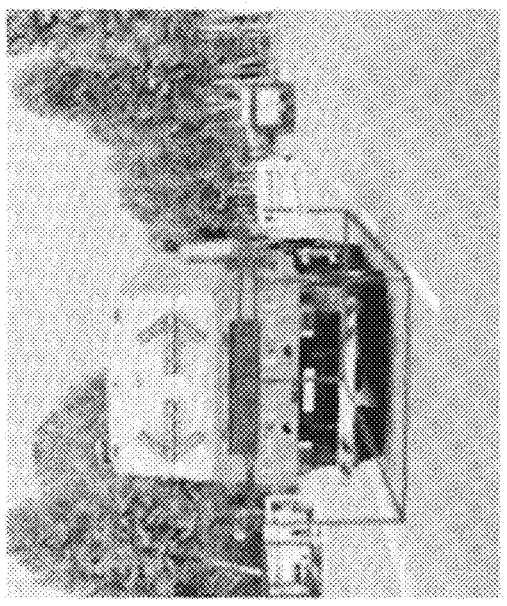

FIGS. 11 and 12 are diagrams illustrating the improvement of the accuracy of class classification.

Referring to FIGS. 11 and 12, because the general YOLO output determines an object based on the size and shape of the appearance based on 3D information, the vehicle shown in FIG. 12 may be misjudged as a bus. To the contrary, according to an embodiment of the present disclosure, because AI learning is performed based on a complex feature map in which image information is mixed in addition to 3D information, it is possible to determine the vehicle shown in FIG. 12 as a truck.

FIGS. 13 and 14 are diagrams illustrating an improvement result of a determination error of a distant object.

Referring to FIGS. 13 and 14, because the general YOLO output determines an object based on the size and shape of the appearance based on 3D information, as in FIG. 14, a fixed structure, not a vehicle, may be misjudged as a bus. To the contrary, according to an embodiment of the present disclosure, because AI learning is performed based on a complex feature map in which image information of a vehicle is mixed, the structure shown in FIG. 14 may not be classified as a vehicle.

FIGS. 15 and 16 are diagrams illustrating an improvement result of omission of detection of a distant object.

Referring to FIGS. 15 and 16, because the general YOLO output determines an object based on 3D information, as in FIG. 16, when the intensity of 3D information obtained from a distance object is low, the object may be not detected. To the contrary, according to an embodiment of the present disclosure, because AI learning is performed based on a complex feature map mixed with image information of a vehicle, the accuracy of object detection may be increased. Accordingly, as shown in FIG. 16, it is possible to more accurately detect a vehicle at a long distance.

Hereinafter, the performance evaluation of object recognition according to an embodiment of the present disclosure is described is as follows.

Table 1 illustrates quantitative performance evaluation using the proposed technique. Table 2 illustrates quantitative performance evaluation using a known technique.

In Table 1 and Table 2, AP means average precision, mean average precision (mAP) means the average of AP for each class, and f1 score means the harmonic mean of precision and recall. In addition, RV means a complex feature map, and ORI means a BEW feature map.

TABLE 1

| RV | size 448 × 896 | range 100 (m) | Class # 5 | epoch 27 |
|---|---|---|---|---|
| 0~100 (m) | | AP | F1 | mAP |
| | Car | 0.9402 | 0.8639 | 0.7932 |
| | Truck | 0.8643 | 0.8121. | mf1 |
| | Bus | 0.9047 | 0.8117 | 0.7367 |
| | Pd | 0.654 | 0.5853 | |
| | Cyc | 06031 | 0.6105 | |
| 0~50 (m) | | AP | F1 | mAP |
| | Car | 0.9657 | 0.9287 | 0.85036 |
| | Truck | 0.9353 | 0.9219 | mf1 |
| | Bus | 0.9633 | 0.9488 | |
| | Pd | 0.7041 | 0.6991 | |
| | Cyc | 0.6834 | 0.7442 | |
| 50~100 (m) | | AP | F1 | mAP |
| | Car | 0.8993 | 0.7853 | 0.69452 |
| | Truck | 0.7747 | 0.711 | mf1 |
| | Bus | 0.8348 | 0.7098 | 0.61778 |

TABLE 1-continued

| RV | size 448 × 896 | range 100 (m) | Class # 5 | epoch 27 |
|---|---|---|---|---|
| | Pd | 0.4975 | 0.4135 | |
| | Cyc | 0.4663 | 0.4693 | |

TABLE 2

| RV | size 448 × 896 | range 100 (m) | Class # 5 | epoch 51 |
|---|---|---|---|---|
| 0~100 (m) | | AP | F1 | mAP |
| | Car | 0.9308 | 0.8431 | 0.76636 |
| | Truck | 0.8472 | 0.7677 | mf1 |
| | Bus | 0.8673 | 0.7866 | 0.6946 |
| | Pd | 0.6024 | 0.4923 | |
| | Cyc | 0.5841 | 0.5806 | |
| 0~50 (m) | | AP | F1 | mAP |
| | Car | 0.9632 | 0.9255 | 0.83312 |
| | Truck | 0.9239 | 0.9016 | mf1 |
| | Bus | 0.9597 | 0.9322 | 0.82454 |
| | Pd | 0.657 | 0.6257 | |
| | Cyc | 0.6618 | 0.7377 | |
| 50~100 (m) | | AP | F1 | mAP |
| | Car | 0.8731 | 0.7477 | 065006 |
| | Truck | 0.74911 | 0.6522 | mf1 |
| | Bus | 0.7576 | 0.676 | 0.56508 |
| | Pd | 0.4183 | 0.3199 | |
| | Cyc | 0.4522 | 0.4296 | |

Referring to Table 1 and Table 2, it may be confirmed that the object recognition performance according to an embodiment of the present disclosure is generally improved in the section of 0 to 50 m and the section of 50 to 100 m.

Regarding each class, in the case of the bus class, it may be understood that the AP increases by about 8% in the section of 50 to 100 m.

In the case of the pedestrian class, it may be confirmed that the AP increases by about 8% in the second of 50 to 100 m.

FIG. 17 is a block diagram illustrating a computing system according to an embodiment of the present disclosure.

Referring to FIG. 17, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM.

The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an embodiment of the present disclosure, YOLO model-based learning is conducted by using a complex feature map in which 3D information that can determine the size of an object and 2D information that can determine the shape of an object are mixed, so that it is possible to recognize an object faster.

In addition, according to an embodiment of the present disclosure, because the complex feature map is used, objects that are difficult to be classified with 3D information because they have similar shapes and sizes may be more accurately classified based on 2D image information.

In addition, various effects that are directly or indirectly understood through the present disclosure may be provided.

Although embodiments of the present disclosure have been described for illustrative purposes, those having ordinary skill in the art should appreciate that various modifications, additions, and substitutions are possible, without departing from the scope and spirit of the disclosure.

Therefore, the embodiments described in the present disclosure are provided for the sake of descriptions, not limiting the technical concepts of the present disclosure. It should be understood that such embodiments are not intended to limit the scope of the technical concepts of the present disclosure. The protection scope of the present disclosure should be understood by the claims below. All the technical concepts within the equivalent scopes should be interpreted to be within the scope of the right of the present disclosure.

What is claimed is:

1. An apparatus for recognizing an object, the apparatus comprising:
a camera configured to obtain a 2D image;
a lidar configured to obtain a 3D image; and
a processor configured to
generate a bird's-eye view (BEV) feature map by extracting features from a two-dimensional plane BEV generated based on 3D information,
generate an image feature map by extracting features of a multi-channel 2D image in which the 3D information is added to the 2D image,
generate a corrected image feature map equal to a resolution of the BEV feature map by correcting a resolution of the image feature map,
generate a complex feature map by mixing the image feature map and the BEV feature map, and
recognize the object by artificial intelligence learning the complex feature map,
wherein the processor is further configured to:
generate the multi-channel 2D image in which a number of channels is expanded by mapping intensity information, density information, and three-dimensional coordinate information obtained through the lidar to the 2D image;
obtain a BEV image based on the intensity information, the density information, and height information from the lidar;
generate the BEV feature map by learning the BEV image using a convolutional neural network;
generate the multi-channel 2D image by mapping the 3D information to the 2D image; and
generate the image feature map by learning the multi-channel 2D image.

2. The apparatus of claim 1, wherein the processor is configured to normalize a Z value of the intensity information, the density information, and the three-dimensional coordinate information to a magnitude of 0 to 1.

3. The apparatus of claim 1, wherein the processor is configured to learn the multi-channel 2D image by using a dilated convolution neural network.

4. The apparatus of claim 1, wherein the processor is configured to generate the complex feature map by extending a number of channels of the image feature map and the BEV feature map.

5. The apparatus of claim 4, wherein the processor is configured to:
generate the complex feature map by mixing components of coordinates corresponding to each other in the corrected image feature map and the BEV feature map.

6. The apparatus of claim 5, wherein the processor is configured to mix feature values of the coordinates corresponding to each other in the corrected image feature map and the BEV feature map by using at least one of an addition scheme, a combination scheme, an average, or a combination thereof.

7. The apparatus of claim 1, wherein the processor is configured to learn the complex feature map by using a you-only-look once (YOLO) model.

8. A method of recognizing an object, the method comprising:
generating, by a processor, a bird's-eye view (BEV) feature map by extracting features from a two-dimensional plane BEV generated based on 3D information;
generating, by the processor, an image feature map by extracting features of a multi-channel 2D image in which the 3D information is added to a 2D image;
generating, by the processor, a complex feature map by mixing the image feature map and the BEV feature map; and
recognizing the object by learning the complex feature map,
wherein the generating of the complex feature map includes: matching a resolution of the image feature map with a resolution of the BEV feature map,
wherein the learning of the multi-channel 2D image includes generating the multi-channel 2D image having 8 channels by mapping intensity information, density information, and three-dimensional coordinate information obtained through a lidar to a red-green-blue (RGB image,
wherein the generating of the BEV feature map includes:
obtaining, by the lidar, the 3D information including the intensity information, the density information, and the three-dimensional coordinate information;
obtaining, by the processor, a BEV image including height information among the intensity information, the density information, and the three-dimensional coordinate information; and
learning, by the processor, the BEV image by using a convolutional neural network, and
wherein the generating of the image feature map includes:
obtaining, by a camera, the RGB image;
generating, by the processor, a multi-channel 2D image by mapping the 3D information to the RGB image; and
learning, by the processor, the multi-channel 2D image.

9. The method of claim 8, wherein the learning of the multi-channel 2D image includes normalizing a Z value of the intensity information, the density information, and the three-dimensional coordinate information to a magnitude of 0 to 1.

10. The method of claim 8, wherein the learning of the multi-channel 2D image includes:

using a dilated convolution neural network.

11. The method of claim 8, wherein the generating of the complex feature map includes extending a number of channels of the image feature map and the BEV feature map.

12. The method of claim 11, wherein the generating of the complex feature map further includes:

mixing components of coordinates corresponding to each other in the image feature map and the BEV feature map.

13. The method of claim 12, wherein the mixing of the components of the coordinates includes using at least one of an addition scheme, a combination scheme, an average, or a combination thereof.

14. The method of claim 8, wherein the recognizing of the object includes using a you-only-look once (YOLO) model.

\* \* \* \* \*